(12) United States Patent
Dupaquis et al.

(10) Patent No.: US 7,809,133 B2
(45) Date of Patent: *Oct. 5, 2010

(54) RANDOMIZED MODULAR REDUCTION METHOD AND HARDWARE THEREFOR

(75) Inventors: Vincent Dupaquis, Biver (FR); Michel Douguet, Marseilles (FR)

(73) Assignee: Atmel Rousset S.A.S., Rousset Cedex (FR)

( * ) Notice: Subject to any disclaimer, the term of this patent is extended or adjusted under 35 U.S.C. 154(b) by 1051 days.

This patent is subject to a terminal disclaimer.

(21) Appl. No.: 10/781,311

(22) Filed: Feb. 18, 2004

(65) Prior Publication Data

US 2005/0105723 A1 May 19, 2005

(30) Foreign Application Priority Data

Nov. 18, 2003 (FR) .................................. 03 13507

(51) Int. Cl.
*H04L 9/28* (2006.01)
*H04L 1/00* (2006.01)

(52) U.S. Cl. .......................... 380/28; 714/100; 714/724
(58) Field of Classification Search .................. 380/28; 714/724
See application file for complete search history.

(56) References Cited

U.S. PATENT DOCUMENTS

| | | | | |
|---|---|---|---|---|
| 5,077,793 A | 12/1991 | Falk et al. | ...................... | 380/28 |
| 5,144,574 A | 9/1992 | Morita | ........................ | 364/746 |
| 5,185,711 A | 2/1993 | Hattori | | |
| 5,210,710 A | 5/1993 | Omura | ..................... | 364/746.1 |
| 5,373,560 A | 12/1994 | Schlafly | ........................ | 380/30 |
| 5,479,511 A | 12/1995 | Naccache | ..................... | 380/28 |
| 5,513,133 A | 4/1996 | Cressel et al. | ................ | 364/754 |
| 5,724,279 A * | 3/1998 | Benaloh et al. | .............. | 708/491 |
| 5,764,554 A | 6/1998 | Monier | ........................ | 364/746 |
| 5,793,659 A | 8/1998 | Chen et al. | ................... | 364/746 |

(Continued)

FOREIGN PATENT DOCUMENTS

WO    WO-2004111831 A2    12/2004

(Continued)

OTHER PUBLICATIONS

*Design of an Efficient Public-Key Cryptographic Library for RISC-based Smart Cards* by Jean-Francois Dhem, Doctorate of Applied Sciences Thesis, Universite Catholique de Louvain, May 1998, pp. 11-22.

(Continued)

*Primary Examiner*—Christian LaForgia
(74) *Attorney, Agent, or Firm*—Schwegman, Lundberg & Woessner, P.A.

(57) ABSTRACT

A cryptographically secure, computer hardware-implemented modular reduction method systematically underestimates and randomizes an approximate quotient used for computation of a remainder. The randomizing error injected into the approximate quotient is limited to a few bits, e.g. less than half a word. The computed remainder is congruent with but a small random multiple of the residue, which can be found by a final set of subtractions by the modulus. In addition to a computational unit and operations sequencer, the computing hardware also includes a random or pseudo-random number generator for producing the random error. The modular reduction method thus resists hardware cryptoanalysis attacks, such as timing and power analysis attacks.

18 Claims, 2 Drawing Sheets

U.S. PATENT DOCUMENTS

| | | | |
|---|---|---|---|
| 5,870,478 A | 2/1999 | Kawamura | 380/30 |
| 5,954,788 A | 9/1999 | Suh et al. | 708/491 |
| 5,999,627 A | 12/1999 | Lee et al. | 380/30 |
| 6,049,815 A | 4/2000 | Lambert et al. | |
| 6,088,453 A | 7/2000 | Shimbo | 380/28 |
| 6,091,819 A | 7/2000 | Venkatesan et al. | 380/28 |
| 6,175,850 B1 | 1/2001 | Ishii et al. | 780/491 |
| 6,366,673 B1 | 4/2002 | Hollmann et al. | 380/28 |
| 6,466,668 B1 | 10/2002 | Miyazaki et al. | 380/30 |
| 7,073,072 B1 * | 7/2006 | Salle | 713/193 |
| 7,164,765 B2 * | 1/2007 | Nishioka et al. | 380/30 |
| 2002/0039418 A1 | 4/2002 | Dror et al. | 380/28 |
| 2002/0055962 A1 | 5/2002 | Schroeppel | |
| 2002/0143836 A1 | 10/2002 | Ebergen et al. | 708/491 |
| 2002/0161810 A1 | 10/2002 | Mellott et al. | 708/491 |
| 2003/0044014 A1 * | 3/2003 | Liardet et al. | 380/268 |
| 2003/0079139 A1 | 4/2003 | Drexler et al. | |
| 2003/0206629 A1 | 11/2003 | Eberle et al. | |
| 2003/0208518 A1 | 11/2003 | Gura et al. | |
| 2003/0212729 A1 | 11/2003 | Eberle et al. | |
| 2004/0019622 A1 | 1/2004 | Elbe et al. | |
| 2004/0066934 A1 | 4/2004 | Chen | |
| 2006/0282491 A1 | 12/2006 | Joye | |
| 2008/0109501 A1 | 5/2008 | Douguet | |
| 2010/0023572 A1 * | 1/2010 | Dupaquis et al. | 708/492 |

FOREIGN PATENT DOCUMENTS

| | | |
|---|---|---|
| WO | WO-2006124160 A2 | 11/2006 |
| WO | WO-2006124160 A3 | 11/2006 |

OTHER PUBLICATIONS

*Implementing the Rivest Sharmi and Adleman Public Key Encryption Algorithm on a Standard Digital Signal Processor* by Paul Barrett, Security Bulletin, Computer Security Ltd., Aug. 1986.

*Efficient Implementation*, Handbook of Applied Cryptography, 1997, Menezes, Oorschot, and Vanstone, pp. 591-635.

*Architectural Tradeoff in Implementing RS* Processor by Fu-Chi Chang and Chia-Jiu Wang, ACM SIGARCH Computer Architecture News archive, Department of Electrical and Computer Engineering, University of Colorado at Colorado Springs, Colorado, vol. 30, Issue 1, Mar. 2002.

J. Grosschadel, *the Chinese Remainder Theorem and Its Application in a High-Speed RSA Crypto Chip*, Dec. 11, 2000, IEEE Comput. Soc., U.S., pp. 384-393, XP010529836. ISBN 0-7695-0859-6.

K.C. Posch et al., r Microprocessing and Microprogramming, Elsevier Science Publishers, BV, Amsterdam NL., vol. 29, No. 3, Oct. 1990, pp. 177-184, XP000151455, ISSN: 0165-6074.

A. Bosselaers et al., "Comparison of Three Modular Reduction Functions", Advances in Cryptology/Crypto '93, LNCS 772, Springer-Verlag, 1994, pp. 175-186.

C.H. Lim et al., "Fast Modular Reduction With Precomputation", preprint, 1999 (available from CiteSeer Scientific Literature Digital Library, 15 pages.

J.F. Dhem, "Design of an Efficient Public-Key Cryptographic Library for RISC-based Smart Cards", doctoral dissertation, Université catholique de Louvain, Louvain-la-Neuve, Belgium, May 1998.

"European Application Serial No. 06749987.1, European Search Report mailed May 28, 2008", 14.

"European Application Serial No. 06749987.1, EP Office Action mailed Oct. 1, 2008", 3 pages.

Bajard, et al., "Arithmetic Operations in the Polynomial Modular Number System", *Research Report LIRMM*, No. 04030, XP002358296, (Sep. 2004), 1-26.

De Dinechin, B. D., "A Ultra Fast Euclidean Division Algorithm for Prime Memory Systems", *ACM*, (1991), 56-65.

Dhem, Jean-Francois, "Efficient Modular Reduction Algorithm in IFq[x] and Its Application to 'Left to Right' Modular Multiplication in IF2[x]", *Cryptographic Hardware and Embedded Systems - CHES* 2003, vol. 2779/2003, XP-002358295, Berlin, (2003), 203-213.

"U.S. Appl. No. 11/203,939, Non-Final Office Action mailed Apr. 16, 2009", 6 pgs.

04800660.5, "European Application serial No. 04800660.5 ,Office Action Mailed on Mar. 3, 2009", 3 pages.

Dhem, J- F, et al., "Design of an Efficient Public-Key Cryptographic Library for RISC based", *Doctorate of Applied Sciences Thesis*, Universite Catholique De Louvain,, (May 1998), pp. 11 to 22.

Donald, E. K, "The Art of Computer Programming vol. 2 Seminumerical Algorithm", *Third Edition, Addison Wesley, USA*, ISBN: 0-20189684-2, (1998), chapter 4.3.2.

"U.S. Appl. No. 11/203,939, Response filed Aug. 17. 2009 to Non Final Office Action mailed Apr. 16, 2009", 6 pgs.

200480033595.5, "Chinese Application No. 200480033595.5, Office Action mailed May 22, 2009", 6 pgs.

Grobchadl, J., "The Chinese Remainder Theorem and Its Application in a High-Speed RSA Crypto Chip", *IEEE Computer Society Wasgington, DC, USA*, (Apr. 29, 2009).

Knuth, Donald E., "Chapter 4.3.2", *The Art of Computer Programming*, vol. 2 Seminumerical Algorithm, Third Edition, , Addison Wesley, USA, ISBN: 0-201-89684-2, (1998), 284-294.

"U.S. Appl. No. 11/203,939, Notice of Allowance mailed Nov. 3, 2009", 6 pgs.

"Chinese Application Serial No. 200480033595.5, Chinese Office Action (with English translation) mailed Oct. 30, 2009", 5 pgs.

"Chinese Application Serial No. 200480033595.5, Response (with English translation) filed Sep. 18, 2009 to Chinese Office Action maiied May 22, 2009", 4 pgs.

"European Application Serial No. 04800660.5, European Office Action mailed Sep. 28, 2007", 2 pgs.

"European Application Serial No. 04800660.5, Response filed Mar. 20, 2008 to European Office Action received Sep. 28, 2007", 13 pgs.

"European Application Serial No. 04800660.5, Supplementary European Search Report mailed Apr. 18, 2007", 2 pgs.

"European Application Serial No. 06749987.1, European Office Action mailed Sep. 18, 2009", 7 pgs.

"European Application Serial No. 06749987.1, Response filed Apr. 8, 2009 to Extended European Search Report mailed Oct. 1, 2008", 7 pgs.

"International Application Serial No. PCT/US2004/036590, International Search Authority Written Opinion mailed Apr. 19, 2005", 3 pgs.

"International Application Serial No. PCT/US2004/036590, International Search Report mailed Apr. 19, 2005", 1 pg.

"International Application Serial No. PCT/US2006/013795, Search Report mailed Oct. 19, 2007", 4 pgs.

"International Application Serial No. PCT/US2006/13795, Written Opinion of the International Search Authority, mailed Oct. 19, 2007", 4 pgs.

Morales-Sandoval, M., et al,, "On the hardware design of an eiliptic curve cryptosystem", *Proceedings of the Fifth Mexican International Conference in Computer Science*, 2004. ENC 2004, (2004), 64-70.

"U.S. Appl. No. 11/203,939, Notice of Allowance mailed Mar. 23, 2010", 4 pgs.

"Chinese Application Serial No. 200480033595.5, Office Action mailed Apr. 13, 2010", 3 Pgs.

"European Application Serial No. 04800660.5, Response filed Aug. 17, 2009 to Office Action received Mar. 3, 2009", 10 pgs.

"European Application Serial No. 06749987.1, Response filed Mar. 29, 2010 to Office Action received Sep. 18, 2009", 8 pgs.

\* cited by examiner

Fig._1

RANDOMIZED MODULAR REDUCTION METHOD AND HARDWARE THEREFOR

RELATED APPLICATIONS

This application claims the benefit of priority, under 35 U.S.C. Section 119, to French Application No. 03/13507 filed on Nov. 18, 2003, which is incorporated herein by reference in its entirety.

TECHNICAL FIELD

The invention relates to arithmetic processing and calculating, especially for use in cryptography applications. The invention relates in particular to residue arithmetic involving modular reduction, especially computations derived from the Barrett reduction method.

BACKGROUND ART

Numerous cryptographic algorithms make use of large-integer multiplication (or exponentiation) and reduction of the product to a residue value that is congruent for a specified modulus that is related to the cryptographic key. Such computations may be susceptible to power analysis and timing attacks. Therefore, it is important that computations be secured so that information about the key cannot be obtained.

At the same time, it is important that these computations be fast and accurate. The large integer multiplication and reduction is usually the most computationally intensive portion of a cryptographic algorithm. Several distinct computational techniques have been developed for efficient modular reduction, including those known as the Quisquater method, the Barrett method and the Montgomery method, along with modifications involving precomputation and table look-up. These well-known techniques are described and compared in the prior art. See, for example: (1) A. Bosselaers et al., "Comparison of three modular reduction functions", Advances in Cryptology/Crypto '93, LNCS 773, Springer-Verlag, 1994, pp. 175-186. (2) Jean François Dhem, "Design of an efficient public-key cryptographic library for RISC-based smart cards", doctoral dissertation, Université catholique de Louvain, Louvain-la-Neuve, Belgium, May 1998. (3) C. H. Lim et al., "Fast Modular Reduction With Precomputation", preprint, 1999 (available from CiteSeer Scientific Literature Digital Library, citeseer.nj.nec.com/109504.html). (4) Hollmann et al., "Method and Device for Executing a Decrypting Mechanism through Calculating a Standardized Modular Exponentiation for Thwarting Timing Attacks", U.S. Pat. No. 6,366,673 B1, Apr. 2, 2002 (based on application filed Sep. 15, 1998).

An objective of the present invention is to provide an improvement of the Barrett modular reduction method and computing apparatus therefor, which is more secure against cryptoanalysis attacks, while still providing fast and accurate results.

Another objective of the present invention is to provide the aforementioned improved method and apparatus which speeds up quotient estimation.

DISCLOSURE OF THE INVENTION

These objects are met by a computer-implemented modular reduction method in which a quotient used for the computation is systematically underestimated with a randomized error of a few bits, e.g., less than one-half word. The resulting remainder is always congruent to the corresponding intermediate product relative to the specified modulus, but is larger than the residue value and differs in a random manner for each execution. Because the quotient needs only be approximated, its estimation is faster. Because the estimation error is deliberately randomized, the method is more secure against cryptoanalysis. Yet the intermediate results are mathematically equivalent (congruent to the true results), and the final result (after a final set of subtractions by the modulus) is the exactly the same, thus achieving the accuracy needed for the invertibility of cryptographic operations.

The hardware used to execute the method steps of the invention includes a random number generator to inject random error into the quotient estimation. A computation unit with memory access and carry injection operates under the control of an operation sequencer executing firmware to carry out the word-wide multiply-accumulate steps of large integer multiplication and modular reduction.

BEST MODE OF CARRYING OUT THE INVENTION

Figure 1:
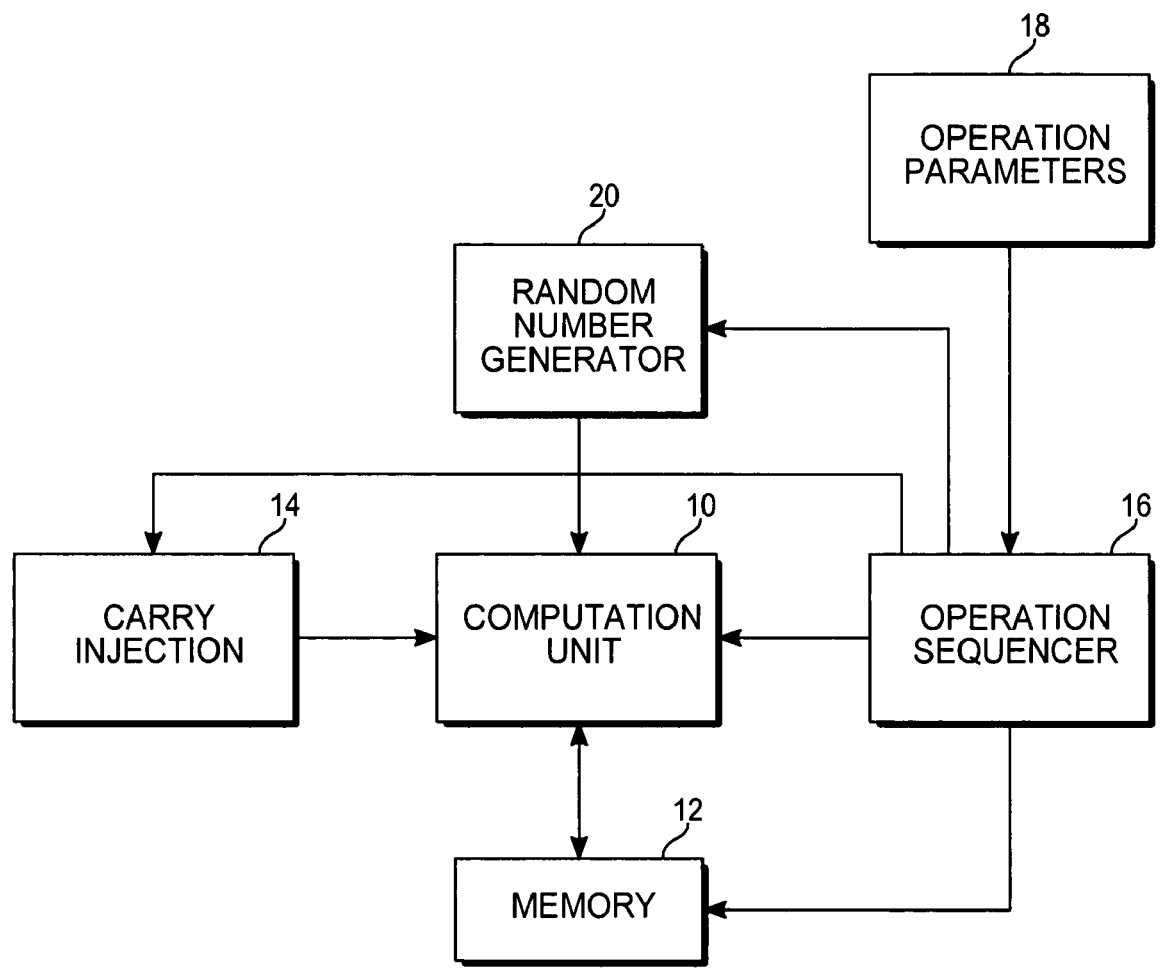
FIG. 1 is a schematic plan view of computational hardware in accord with the present invention (including a random number generator unit), which is used to execute the modular reduction method of the present invention.

With reference to FIG. 1, computational hardware includes a computation unit 10 that is able to perform word-wide multiply and multiply-accumulate steps on operands retrieved from memory (RAM) 12 and carry terms from registers 14. An operation sequencer 16 comprises logic circuitry for controlling the computation unit 10 in accord with firmware or software instructions for the set of operations to carry out the large-integer multiplication (or exponentiation) and the modular reduction. The operation parameters, stored in registers 18 accessible by the operation sequencer 16, consist in pointers that enable the operation sequencer to locate an operand within the RAM 12, as well as information about the lengths (number of words) of the operands, carry injection control information, and the destination address of the intermediate results. So far, the apparatus is substantially similar to other available hardware adapted for large-integer arithmetic operations. Other than the details of the reduction steps, which will be described below, the firmware or software instructions are also similar to prior programs for executing efficient large-integer multiplication or exponentiation in word-wide segments.

Unlike prior hardware of this type, the hardware in FIG. 1 also includes a random number generator 20, which for example can be any known pseudo-random number generator circuit. The random number generator performs a calculation and outputs a random number used in the present method. Here, the random number generator 20 is accessed by the computation unit 10, as directed by the operation sequencer 16 in accord with the program instructions implementing the method of the present invention, in order to inject the randomized error quantity into the quotient estimation, as described below.

Figure 2:
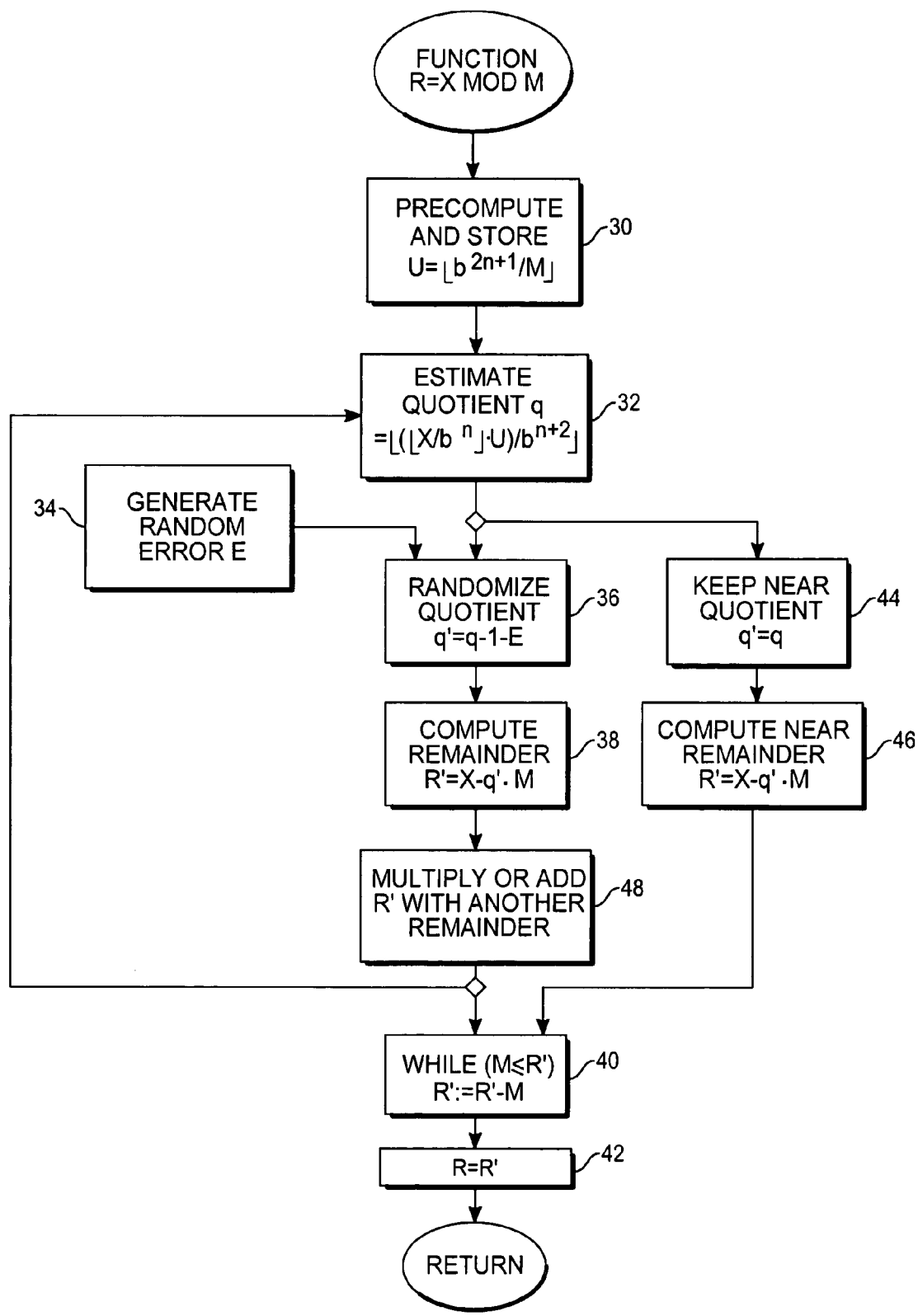
FIG. 2 is a flow diagram illustrating the general steps in the present modular reduction method.

With reference to FIG. 2, the method of the present invention is an improvement of the Barrett modular reduction technique, providing faster quotient estimation and resistance to cryptoanalytic attack. The method is executed by the hardware in FIG. 1.

Modular reduction generally solves $R \equiv X \bmod M \equiv X - \lfloor X/M \rfloor M$, where R is the residue value to be found which is congruent to X for modulus M, and the symbol $\lfloor a \rfloor$ represents the floor function (the largest integer $\leq a$) so that $\lfloor X/M \rfloor$ corresponds to an integer division. The number X to be reduced is typically a product of two large (usually prime) integers, $X = A \cdot B$, i.e., where one or both of the integers A and B are of multi-word size (e.g., A and B might be 1024 bits each, i.e. 32 32-bit words long). In any case, the basic problem in any modular reduction method is in evaluating the quotient $q = \lfloor X/M \rfloor$ in an efficient way for large (multi-word) numbers X and M. In the present invention, an additional problem is in performing the reduction in a way that is secure from power analysis attacks in cryptographic applications.

Barrett's method involves precalculating and storing a scaled estimate of the modulus' reciprocal, U, and replacing the long division with multiplications and word shifts (dividing by b) in order to estimate the quotient. With appropriate choice of parameters, the error in the quotient estimate is at most two. The present invention improves upon Barrett's method by only approximating the quotient with a less precise but faster estimation, and by intentionally injecting a random error into the quotient prior to computing the remainder. The resulting remainder will be slightly larger than, but congruent with, the residue value.

Let w represent the word size (e.g., w=32 for 32-bit processors), $b = 2^w$ represent the radix, n be the length of the modulus M in words, where $$M = \sum_{i=0}^{n-1} m_i b^i,$$

$$0 < m_{n-1} < b,$$

$$0 \leq m_i < b, \text{ for } i=0 \text{ to } n-2,$$

$$b^{n-1} \leq M < b^n,$$

and X be the number to be reduced, which is up to 2n+1 words in length, i.e., where $$X = \sum_{i=0}^{2n} x_i b^i,$$

$$0 \leq x_i < b, \text{ for } i=0 \text{ to } 2n,$$

$$0 \leq X < b^{2n+1} \text{ (or } M \leq X < b^{2n+1} \text{ in certain circumstances)}$$

We begin by precomputing and storing (step 30 in FIG. 2) a constant U representing the scaled reciprocal of the modulus M $$U = \lfloor b^{2n+1}/M \rfloor = \lfloor 2^{2nw+w}/M \rfloor$$

This stored value is then subsequently used in all reduction operations for this particular modulus M. U is always n+1 words long for every modulus M which is not a power of b.

To perform a modulo reduction of X, we estimate a quotient q (step 32) using the stored value U:

$$q = \lfloor (\lfloor X/b^n \rfloor \cdot U)/b^{n+2} \rfloor = \lfloor (\lfloor X/2^{nw} \rfloor \cdot U)/2^{nw+2w} \rfloor$$

This requires only multiplications and word-size shifts for the computation. The floor functions tend to ensure that the quotient q is consistently underestimated (never overestimated) although it is possible that the quotient estimate will happen to be exact. A supplemental subtraction by one could be included if underestimation is required. Both the constant U and the quotient estimation differ from that of Barrett by an extra shift each of one word. (Barrett uses $U = \lfloor b^{2n}/M \rfloor$ and $q = \lfloor (\lfloor X/b^{n-1} \rfloor \cdot U)/b^{n+1} \rfloor$.) The estimated quotient $q \geq 0$ will be a maximum of n+1 words long.

At this stage, it is preferable to inject (step 36) a random error E into the computed quotient to obtain a randomized quotient, $q' = q - E$. In this case, we must have $M \cdot 2^{w/2} \leq X < b^{2n+1}$ to avoid having negative numbers. The random error E may be generated (step 34) by any known random or pseudo-random number generator (hardware or software). The only constraint is that the error fall within a specified range, such as $$0 \leq E < (2^{w/2} - 1)$$

This limits the potential error contributed by the random generator to a specified number of bits, e.g. half a word, in addition to any error arising from the quotient estimation itself.

Next, we compute (step 38) the remainder R', which will be congruent (modulo M) with the residue value R:

$$R' = X - q'M$$

Because the quotient q is underestimated, and a random error E is introduced, the remainder $R' \geq R$, i.e. the calculated remainder will be larger than or equal to the residue by some small random multiple of the modulus M.

The randomized remainder R' can be used in further calculations (step 48), such as multiply or add, with another remainder R" (randomized or not), which if necessary is again reduced (returning to step 32) for consistency. (The error remains bounded.) Alternatively, if randomization is not required, we can choose to keep the near quotient q (step 44). In this case, we can have $0 \leq X < b^{2n+1}$. Keeping near the quotient will permit one to get the true remainder (steps 46 and 40).

Finally, depending upon the needs of the particular application, the residue R can be calculated from the remainder R' by applying subtractions of the modulus M (step 40) until the number is smaller than M. The residue value R which equals R' after the final subtraction can then be returned for use in the remainder of the cryptography system (step 42).

Randomizing the modular reduction provides security against various cryptoanalytic attacks that rely upon consistency in power usage to determine the modulus. Here, the reduction of X modulo M varies randomly from one execution to the next, while still producing an intermediate remainder R' that is congruent. The number of subtractions at the end to generate a final residue value R also varies randomly from one execution to the next. The number X to be reduced in this way can be obtained from a variety of different arithmetic operations, including multiplication, squaring, exponentiation, addition, etc. Likewise, the modulus M to be used can be derived in a variety of ways, most usually in cryptography from a key. The randomized modular reduction method of the present invention is useful in many cryptographic algorithms that rely upon such reduction, including both large prime (e.g. RSA) and elliptic curve-based public-key cryptography systems.

What is claimed is:

1. A cryptographically secure, computer hardware-implemented modular reduction method, comprising:
   precomputing and storing in memory a constant U representing a bit-scaled reciprocal of a modulus M;
   computing an estimated quotient value q for a number X to be reduced modulo M, wherein said computing is executed upon X in a computation unit by a multiplication by said constant U and by bit shifts of X and a shift of said multiplication;
   generating in a random number generator a random error value E;

applying said generated random error value E to said estimated quotient value q to obtain a randomized quotient q'=q−E, wherein the random number generator has a specified error limit of one-half word, whereby $0 \leq E < (2^{w/2}-1)$, with "w" being the word size of the computation unit in bits; and calculating a remainder R'=X−q'M in said computation unit, said remainder R' being larger than said modulus M but congruent to X modulo M.

2. The method of claim 1 wherein precomputing said constant U is performed according to the equation $U=[b^{2n+1}/M]$, where $b=2^w$, with w being the word size of the computation unit in bits.

3. The method of claim 2 wherein computing the estimated quotient value q is performed by the computation unit according to the equation $q=[([X/b^n] \cdot U)/b^{n+2}]$.

4. The method of claim 3 wherein a supplemental subtraction by one is included in the computing of the estimated quotient value q.

5. The method of claim 1 wherein the modular reduction of X is part of a computer hardware-implemented cryptography program.

6. The method of claim 1 wherein an alternate calculation pathway is provided wherein generating and applying an error value to the estimated quotient value q may be selectively omitted.

7. The method of claim 1, comprising providing an alternate calculation pathway to selectively omit generating and applying an error value to the estimated quotient value q.

8. Computational hardware for executing a cryptographically secure modular reduction method, the hardware comprising:

a computation unit adapted to perform word-wide multiply and accumulate steps on operands retrieved from a memory and carry terms from a set of registers;

a random number generator for generating a random error value E, wherein the random number generator has a specified error limit of one-half word, whereby $0 \leq E < (2^{w/2}-1)$, with "w" being the word size of the computation unit in bits;

an operations sequencer comprising logic circuitry for controlling the computation unit and random number generator in accord with program instructions so as to carry out a modular reduction of a number X with respect to a modulus M that involves at least a computation of an estimated quotient value q from a pre-stored constant U representing a bit-scaled reciprocal of the modulus, a randomization of said estimated quotient value q with said random error value E to obtain a randomized quotient q'=q−E, and a calculation of a remainder value R'=X −q'M.

9. The computation hardware of claim 8 further comprising operation parameter registers accessible by said operations sequencer, said registers containing any one or more of (a) pointers for locating operands within said memory, (b) information about lengths of operands, (c) carry injection control information for carry term registers, and (d) destination address information for intermediate results of operation steps.

10. The computation hardware of claim 8 wherein the pre-stored constant U in said memory is obtained from a precomputation according to the equation $U=[b^{2n+1}/M]$, where $b=2^w$, with w being the word size of the computation unit in bits.

11. The computation hardware of claim 10 wherein the computation of said estimated quotient value q performed by said computation unit under control of said operations sequencer carrying out program instructions is done according to the equation $q=[([X/b^n] \cdot U)/b^{n+2}]$.

12. The computation hardware of claim 11 wherein the computation of the estimated quotient value q performed by the computation unit includes a supplemental subtraction by one.

13. A memory, comprising instructions, which when implemented by a processor, perform the following operations:

precomputing and storing in the memory a constant U representing a bit-scaled reciprocal of a modulus M;

computing an estimated quotient value q for a number X to be reduced modulo M, wherein said computing is executed upon X in a computation unit by a multiplication by said constant U and by bit shifts of X and a shift of said multiplication;

generating in a random number generator a random error value E;

applying said generated random error value E to said estimated quotient value q to obtain a randomized quotient q'=q−E, wherein the random number generator has a specified error limit of one-half word, whereby $0 \leq E < (2^{w/2}-1)$, with "w" being the word size of the computation unit in bits; and calculating a remainder R'=X−q'M in said computation unit, said remainder R' being larger than said modulus M but congruent to X modulo M.

14. The memory of claim 13, wherein precomputing said constant U is performed according to the equation $U=[b^{2n+1}/M]$, where $b=2^w$, with w being the word size of the computation unit in bits.

15. The memory of claim 14, wherein computing the estimated quotient value q is performed by the computation unit according to the equation $q=[([X/b^n] \cdot U)/b^{n+2}]$.

16. The memory of claim 15 wherein a supplemental subtraction by one is included in the computing of the estimated quotient value q.

17. The memory of claim 13, wherein the modular reduction of X is part of a computer hardware-implemented cryptography program.

18. The memory of claim 13, wherein an alternate calculation pathway is provided wherein generating and applying an error value to the estimated quotient value q may be selectively omitted.

\* \* \* \* \*